（12）United States Patent
Sakurai

(10) Patent No.: US 8,797,345 B2
(45) Date of Patent: Aug. 5, 2014

(54) COLOR GAMUT BOUNDARY INFORMATION GENERATING DEVICE, COLOR GAMUT BOUNDARY INFORMATION GENERATING METHOD, AND COMPUTER READABLE MEDIUM

(75) Inventor: Takuya Sakurai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 260 days.

(21) Appl. No.: 13/216,614

(22) Filed: Aug. 24, 2011

(65) Prior Publication Data
US 2012/0249520 A1 Oct. 4, 2012

(30) Foreign Application Priority Data
Mar. 29, 2011 (JP) .................................. 2011-073413

(51) Int. Cl.
*G09G 5/02* (2006.01)
(52) U.S. Cl.
USPC ......................................... 345/590; 345/589
(58) Field of Classification Search
None
See application file for complete search history.

(56) References Cited

U.S. PATENT DOCUMENTS

| 6,556,198 | B1 | 4/2003 | Nishikawa | |
| 6,778,185 | B1* | 8/2004 | Moroney | 345/590 |
| 8,207,982 | B2* | 6/2012 | Tin | 345/589 |
| 2010/0128055 | A1* | 5/2010 | Blonde et al. | 345/590 |
| 2012/0249520 | A1* | 10/2012 | Sakurai | 345/419 |

FOREIGN PATENT DOCUMENTS

JP        A-10-188030        7/1998

* cited by examiner

*Primary Examiner* — Antonio A Caschera
(74) *Attorney, Agent, or Firm* — Oliff PLC

(57) ABSTRACT

A color gamut boundary information generating device includes a receiving unit, a tetrahedralizing unit, a first generating unit, and a correcting unit. The receiving unit receives pieces of coordinate information indicating points in a color space. The tetrahedralizing unit performs a tetrahedralization process. The first generating unit generates boundary information, which is a set of outermost triangular faces among triangular faces obtained through the tetrahedralization process. The correcting unit selects a target face from among the triangular faces included in the boundary information, regards a tetrahedron including the target face as a target tetrahedron, determines whether or not the target tetrahedron satisfies a condition, and, if the target tetrahedron does not satisfy the condition, selects the triangular faces included in the target tetrahedron except the target face, eliminates the target face from the boundary information, and adds the selected triangular faces to the boundary information, thereby correcting the boundary information.

14 Claims, 10 Drawing Sheets

| IDENTIFICATION INFORMATION | COORDINATES OF BOUNDARY POINT | COORDINATES AFTER MAPPING (ON SPHERE) |
|---|---|---|
| 1 | (x1,y1,z1) | (u1,v1,w1) |
| 2 | (x2,y2,z2) | (u2,v2,w2) |
| ⋮ | ⋮ | ⋮ |

| IDENTIFICATION INFORMATION | COORDINATES OF BOUNDARY POINT | COORDINATES AFTER MAPPING (ON PLANE) |
|---|---|---|
| 1 | (x1,y1,z1) | (ξ1,η1,ζ1) |
| 2 | (x2,y2,z2) | (ξ2,η2,ζ2) |
| ⋮ | ⋮ | ⋮ |

COLOR GAMUT BOUNDARY INFORMATION GENERATING DEVICE, COLOR GAMUT BOUNDARY INFORMATION GENERATING METHOD, AND COMPUTER READABLE MEDIUM

CROSS-REFERENCE TO RELATED APPLICATIONS

This application is based on and claims priority under 35 USC 119 from Japanese Patent Application No. 2011-073413 filed Mar. 29, 2011.

BACKGROUND (i) Technical Field

The present invention relates to a color gamut boundary information generating device, a color gamut boundary information generating method, and a computer readable medium.

(ii) Summary

According to an aspect of the invention, there is provided a color gamut boundary information generating device including a receiving unit, a tetrahedralizing unit, a first generating unit, and a correcting unit. The receiving unit receives plural pieces of coordinate information indicating plural points in a color space that is independent of an output device, respectively. The tetrahedralizing unit performs a tetrahedralization process, with the plural points in the color space specified by the plural pieces of coordinate information received by the receiving unit serving as vertexes. The generating unit generates boundary information, which is a set of outermost triangular faces forming a convex hull among triangular faces obtained through the tetrahedralization process. The correcting unit selects one of the triangular faces included in the boundary information generated by the generating unit, the selected triangular face serving as a target face, regards a tetrahedron including the target face as a target tetrahedron, determines whether or not the target tetrahedron satisfies a predetermined condition, and, if the target tetrahedron does not satisfy the predetermined condition, selects the triangular faces included in the target tetrahedron except the target face, eliminates the target face from the boundary information, and adds the selected triangular faces to the boundary information, thereby correcting the boundary information.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to the attached drawings. A color gamut boundary information generating device 1 according to the exemplary embodiment is configured to obtain color gamut boundary information that is necessary for so-called gamut mapping, in which information about device independent colors is mapped to a reproducible color range of an output-target device. The color gamut boundary information generating device 1 is provided and used in a color printer, a color image forming device, a multifunction device including a scanner, an information processing device such as a computer for controlling these devices, or the like.

Figure 1:
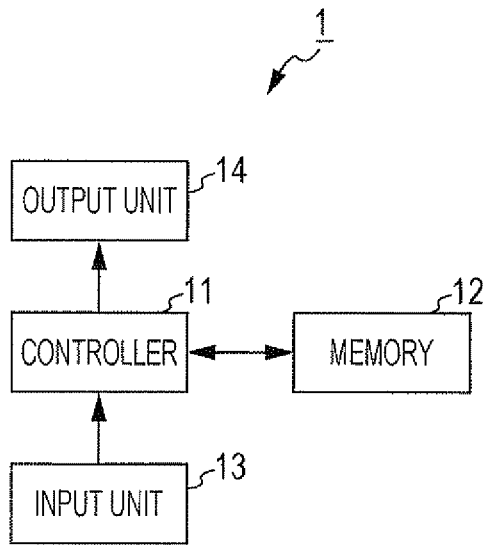
FIG. 1 is a block diagram illustrating an example configuration of a color gamut boundary information generating device according to an exemplary embodiment of the present invention.

The color gamut boundary information generating device 1 according to the exemplary embodiment includes a controller 11, a memory 12, an input unit 13, and an output unit 14, as illustrated in FIG. 1.

Here, the controller 11 is a program control device, such as a central processing unit (CPU), and operates in accordance with a program stored in the memory 12. In the exemplary embodiment, the controller 11 receives plural pieces of coordinate information indicating plural points in a color space that is independent of an output device (referred to as a target color space), performs a tetrahedralization process, with the individual points in the color space specified by the received pieces of coordinate information serving as vertexes. Then, the controller 11 generates boundary information, which is a set of the outermost triangular faces forming a convex hull among triangular faces obtained through the tetrahedralization process. Then, the controller 11 selects one of the triangular faces included in the generated boundary information, the selected triangular face serving as a target face, regards a tetrahedron having the target face as a target tetrahedron, and determines whether or not the target tetrahedron satisfies a predetermined condition. If the target tetrahedron does not satisfy the predetermined condition, the controller 11 selects the triangular faces included in the target tetrahedron except the target face (selects the three other triangular faces), eliminates the target face from the boundary information, and adds the selected triangular faces to the boundary information, thereby correcting the boundary information. The details of the process performed by the controller 11 will be described below.

The memory 12 is a memory device or the like, and stores a program executed by the controller 11. The program stored in the memory 12 may be provided by being stored in a computer readable recording medium, such as a digital versatile disc read only memory (DVD-ROM), and may be copied to the memory 12 so as to be stored therein. The memory 12 also operates as a working memory of the controller 11.

The input unit 13 is an interface device that receives input of information from an external device. In the exemplary embodiment, the input unit 13 receives input of information representing the coordinates in a target color space (a predetermined color space that is independent of an output device) of a point group including plural points existing in a color gamut that may be expressed by an output-target device and that is represented by a three-dimensional shape in the target color space. Then, the input unit 13 outputs the received information to the controller 11. Here, the color space that is independent of an output device (hereinafter referred to as "device independent color space") is an XYZ color space, an L*a*b* color space, or the like.

The output unit 14 outputs color gamut boundary information, which is information specifying the three-dimensional shape representing a reproducible color range of an output-target device in a target color space, in accordance with an instruction input from the controller 11.

Figure 2:
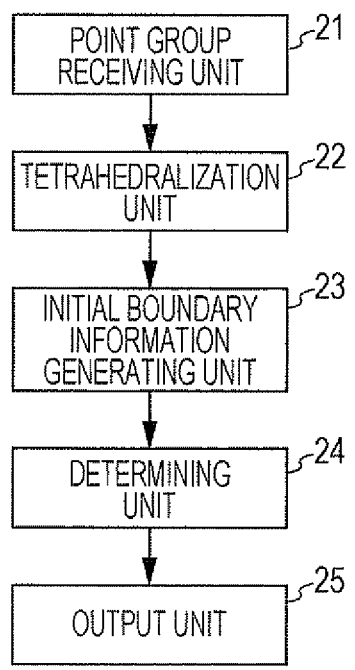
FIG. 2 is a block diagram illustrating an example functional configuration of the color gamut boundary information generating device according to the exemplary embodiment.

Next, an example of a process of generating color gamut boundary information performed by the controller 11 will be described. As illustrated in FIG. 2, the controller 11 according to the exemplary embodiment functionally includes a point group receiving unit 21, a tetrahedralization unit 22, an initial boundary information generating unit 23, a determining unit 24, and an output unit 25.

The point group receiving unit 21 receives coordinate information about plural points in a device independent target color space, such as an L*a*b* color space. Hereinafter, the coordinate information will be represented by (xi, yi, zi). Here, x, y, and z represent three components of a color space, which is not specified as being an xyz color space or an XYZ color space. That is, x, y, and z may be L*, a*, and b*, respectively.

The tetrahedralization unit 22 forms plural tetrahedrons, with the individual points included in the point group received by the point group receiving unit 21 serving as the vertexes thereof. This process is widely known as tetrahedralization, and thus the detailed description thereof is omitted here. For example, a method realized by expanding Delaunay triangulation to a three-dimensional region may be employed.

The initial boundary information generating unit 23 selects the outermost triangular faces (that form a convex hull) from among the triangular faces included in the tetrahedrons obtained by the tetrahedralization unit 22. Specifically, the initial boundary information generating unit 23 may select triangular faces that belong to a single tetrahedron from among the triangular faces forming the tetrahedrons obtained by the tetrahedralization unit 22. The initial boundary information generating unit 23 generates initial boundary information, which is a set of information specifying the selected triangular faces (coordinate information of individual vertexes included in the selected triangular faces).

The determining unit 24 sequentially selects the triangular faces specified by information included in the generated boundary information. Each of the selected triangular faces serves as a target face. Then, the determining unit 24 regards each tetrahedron including a selected target face as a target tetrahedron, and determines whether or not the target tetrahedron satisfies a predetermined condition (referred to as a boundary condition). The predetermined condition includes at least any one of the following conditions.

(1) Among the vertexes of the target tetrahedron including a target face, the vertex that is the nearest to the center of gravity of the target tetrahedron is included in the target face.

(2) In the triangular faces included in the target tetrahedron, except a target face, angles defining a vertex that is not included in the target face among the vertexes of the target tetrahedron satisfy a predetermined angle condition.

(3) The area ratios of the triangular faces included in the target tetrahedron satisfy a predetermined area ratio condition.

(4) The signs of the inner products of normal vectors of the triangular faces included in the target tetrahedron satisfy a predetermined sign condition.

Each of these conditions will be described below. In the case of combining plural conditions, a result of a logical operation, such as OR or AND of the conditions, is used. The angle condition described in (2) is the following condition. In the triangular faces included in the target tetrahedron, except a target face, the cosine value of an angle defining a vertex not included in the target face among the vertexes of the target tetrahedron is within a predetermined range.

Figure 3:
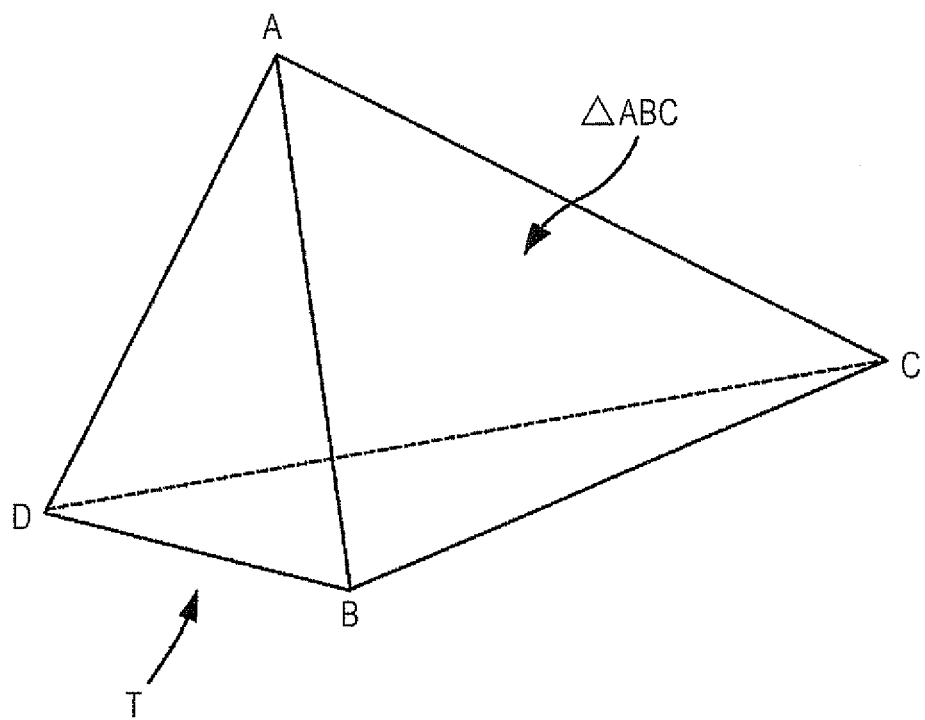
FIG. 3 is an explanatory diagram illustrating an example of a tetrahedron generated in the color gamut boundary information generating device according to the exemplary embodiment.

If any of the conditions is not satisfied, the determining unit 24 selects new faces, that is, the triangular faces included in the target tetrahedron other than the already selected target face. Then, the determining unit 24 eliminates the target face from the boundary information and adds the information specifying the newly selected faces (coordinate information of individual vertexes included in the selected triangular faces) to the boundary information, thereby correcting the boundary information. Specifically, referring to FIG. 3, the determining unit 24 deletes a target face (for example, the triangle ABC in FIG. 3), which is one of the faces of a target tetrahedron T having vertexes A, B, C, and D, and selects the three other faces (triangles ABD, ACD, and BCD) of the target tetrahedron T as new faces.

The determining unit 24 performs this process on each of the triangular faces specified by information included in the boundary information. After ending the process, the determining unit 24 outputs the boundary information to the output unit 25. The output unit 25 outputs the boundary information supplied from the determining unit 24.

Figure 4:
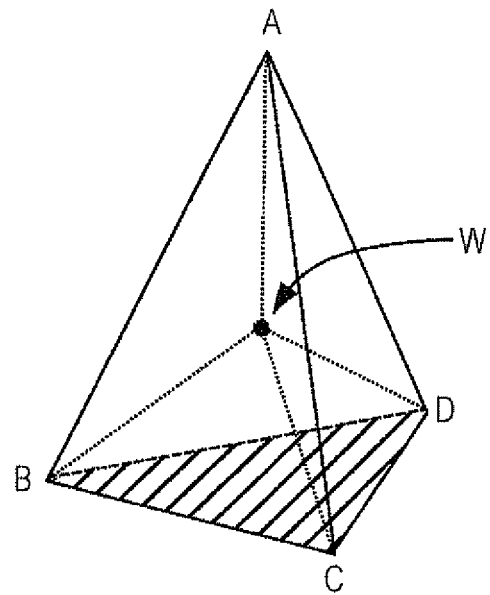
FIG. 4 is an explanatory diagram illustrating an example of a condition for determination used in the color gamut boundary information generating device according to the exemplary embodiment.

Now, each of the foregoing boundary conditions will be described. Regarding the condition (1), in a target tetrahedron having vertexes A, B, C, and D illustrated in FIG. 4, it is assumed that a triangle BCD serves as a target face. In a case where the vertex nearest to the center of gravity W of the target tetrahedron is the vertex A among the vertexes A, B, C, and D, that is, in a case where WA<WB, WC, and WD, it is determined that (1) among the vertexes of the target tetrahedron including a target face, the vertex that is the nearest to the center of gravity of the target tetrahedron is not included in the target face.

Accordingly, in a case where a target tetrahedron is too flat, the target face is eliminated from the boundary information, thereby determining that the inside of the target tetrahedron is outside of the color gamut.

Figure 5:
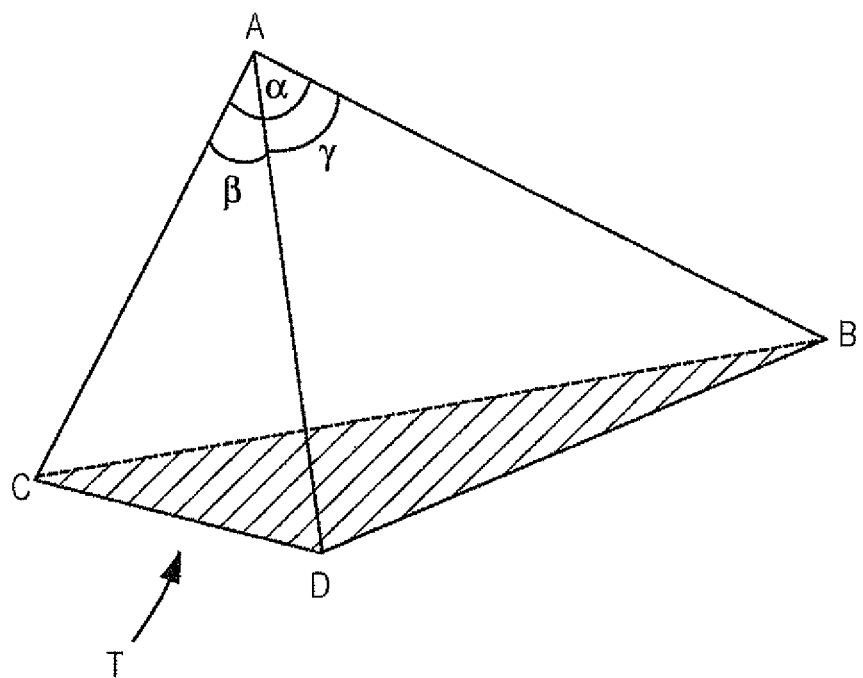
FIG. 5 is an explanatory diagram illustrating another example of a condition for determination used in the color gamut boundary information generating device according to the exemplary embodiment.

Regarding the condition (2), in a target tetrahedron having vertexes A, B, C, and D illustrated in FIG. 5, it is assumed that a triangle BCD serves as a target face. In a case where each of cos α, cos β, and cos γ, which represent the cosines of angles α=angle BAC, β=angle CAD, and γ=angle DAB, is within a predetermined range between a predetermined minimum value Vmin and a predetermined maximum value Vmax, in which $V\text{min} < \cos\theta < V\text{max}$ (θ is any one of α, β, and γ), $V\text{min} \le \cos\theta < V\text{max}$ (θ is any one of α, β, and γ), $V\text{min} < \cos\theta \le V\text{max}$ (θ is any one of α, β, and γ), or $V\text{min} \le \cos\theta \le V\text{max}$ (θ is any one of α, β, and γ), it is determined that the condition is satisfied.

Alternatively, regarding the condition (2), positive and negative signs of the foregoing cos α, cos β, and cos γ may be used, and it may be determined that the condition is not satisfied if the signs of cos α, cos β, and cos γ are positive, positive, and negative, respectively.

Accordingly, the inside of a too flat target tetrahedron or a target tetrahedron in which one of the vertexes is very far from another vertex is determined to be outside of the color gamut.

Figure 6:
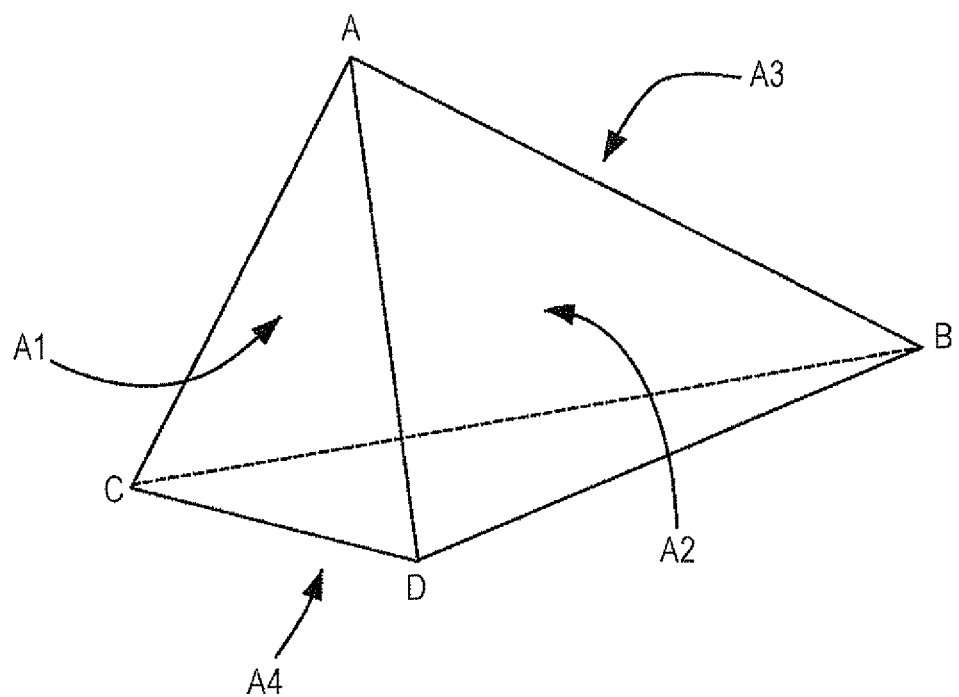
FIG. 6 is an explanatory diagram illustrating still another example of a condition for determination used in the color gamut boundary information generating device according to the exemplary embodiment.

Furthermore, the condition (3) is as follows. With an expanded cosine theorem regarding a target tetrahedron having vertexes A, B, C, and D illustrated in FIG. 6, α represents an angle formed by a plane including a triangle ABC and a plane including a triangle ACD, β represents an angle formed by the plane including the triangle ACD and a plane including a triangle ABD, and γ represents an angle formed by the plane including the triangle ABC and the plane including the triangle ABD. Also, the area of the triangle ABC is represented by A1, the area of the triangle ACD is represented by A2, the area of the triangle ABD is represented by A3, and the area of the triangle BCD is represented by A4.

In this case, individual area ratios R14=A1/A4, R24=A2/A4, and R34=A3/A4 are calculated by using the following expression (the area A4 is calculated by using expression (1)).

$$A4^2 = \qquad (1)$$
$$A1^2 + A2^2 + A3^2 - 2(A1 A2 \cos\alpha) - 2(A2 A3 \cos\beta) - 2(A3 A1 \cos\gamma)$$

If each of the area ratios R14, R24, and R34 is within a range between a predetermined minimum value Rmin and a predetermined maximum value Rmax, it is determined that the condition is satisfied. Otherwise, it is determined that the condition is not satisfied, and the information specifying the target face is deleted from the boundary information. Note that Rmin≤1≤Rmax may be satisfied.

Accordingly, in a case where there is a large difference between the area of a bottom face and the area of a side face (in a case where a target tetrahedron is too flat), the inside of the target tetrahedron is determined to be outside of the color gamut.

Figure 7:
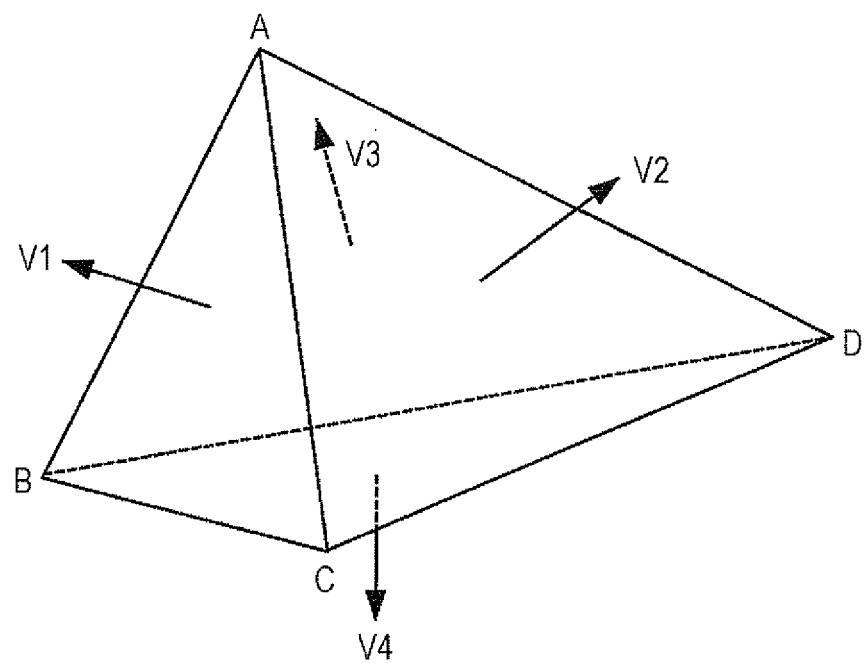
FIG. 7 is an explanatory diagram illustrating still another example of a condition for determination used in the color gamut boundary information generating device according to the exemplary embodiment.

Furthermore, regarding the condition (4), in a target tetrahedron having vertexes A, B, C, and D illustrated in FIG. 7, a normal vector of a plane including a triangle ABC is represented by V1, a normal vector of a plane including a triangle ACD is represented by V2, a normal vector of a plane including a triangle ABD is represented by V3, and a normal vector of a plane including a triangle BCD is represented by V4. By using these normal vectors V1, V2, V3, and V4, the inner products of these vectors V1·V4, V2·V4, V3·V4, V1·V2, V1·V3, and V2·V3, are calculated. If the signs of all the inner products are negative, it is determined that the condition is satisfied. Otherwise, it is determined that the condition is not satisfied, and the information specifying the target face is deleted from the boundary information.

Figure 8:
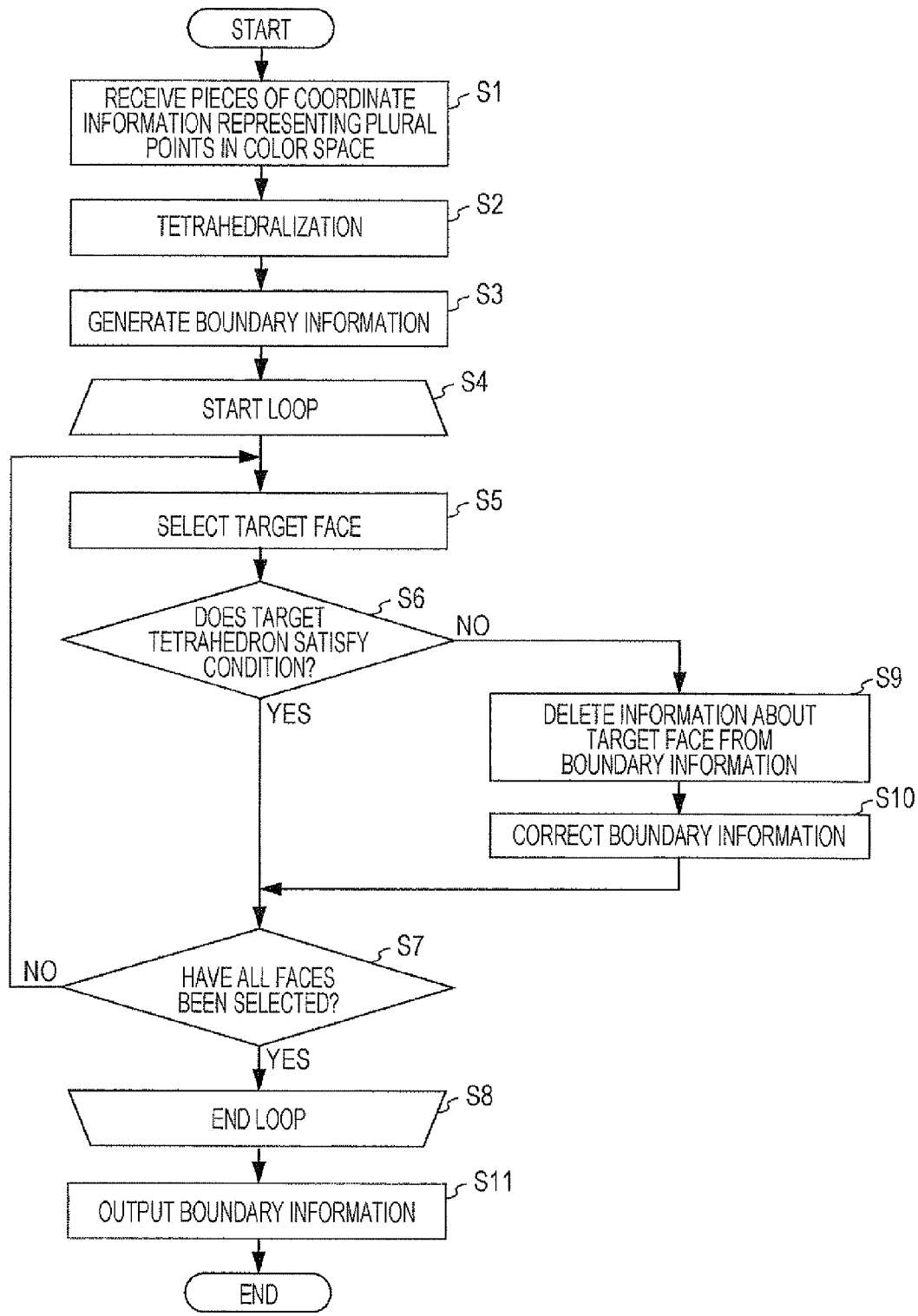
FIG. 8 is a flowchart illustrating an example operation of the color gamut boundary information generating device according to the exemplary embodiment.

The color gamut boundary information generating device 1 according to the exemplary embodiment has the above-described configuration, and operates in the following manner. As illustrated in FIG. 8, the color gamut boundary information generating device 1 according to the exemplary embodiment receives plural pieces of coordinate information representing plural points in a device independent color space (step S1). Then, the color gamut boundary information generating device 1 performs a tetrahedralization process, using the individual points in the color space specified by the received pieces of coordinate information as vertexes (step S2).

The color gamut boundary information generating device 1 generates boundary information, which is a set of information specifying the outermost triangular faces forming a convex hull among the triangular faces obtained in step S2 (step S3). Subsequently, the color gamut boundary information generating device 1 starts a loop (step S4) for performing the following process on each of the triangular faces specified by the information included in the boundary information, and selects unselected one of the triangular faces included in the generated boundary information (step S5). The selected triangular face is regarded as a target face.

The color gamut boundary information generating device 1 regards the tetrahedron including the target face selected in step S5 as a target tetrahedron, and determines whether or not the target tetrahedron satisfies a predetermined condition (step S6). If it is determined that the target tetrahedron satisfies the condition (YES in step S6), the process proceeds to step S7, where the color gamut boundary information generating device 1 determines whether or not all the faces have been selected. If there is an unselected face (NO in step S7), the process returns to step S5, where the color gamut boundary information generating device 1 selects the next face and continues the process. If all the faces included in the boundary information have been selected (there is no unselected face), the color gamut boundary information generating device 1 ends the loop (step S8) and outputs the boundary information (step S11).

On the other hand, if it is determined in step S6 that the target tetrahedron does not satisfy the predetermined condition (NO in step S6), the color gamut boundary information generating device 1 deletes the information specifying the target face from the boundary information (step S9). Then, the color gamut boundary information generating device 1 adds, to the boundary information, the information specifying the triangular faces except the target face among the triangular faces included in the target tetrahedron (step S10), and the process returns to step S7.

Furthermore, the color gamut boundary information generating device 1 may additionally perform the following process on the boundary information to be output. That is, the color gamut boundary information generating device 1 regards the vertexes included in the triangular faces included in the boundary information output in step S11 as boundary points in a device independent color space. Then, the color gamut boundary information generating device 1 maps the boundary points to corresponding points in a two-dimensional region while maintaining the phases of the boundary points, performs triangulation on the inside of a convex hull including plural points in the two-dimensional region obtained through the mapping, and generates triangulation information, which is a result of the triangulation. Also, the color gamut boundary information generating device 1 may generate color gamut boundary information on the basis of the triangular information. The color gamut boundary information is information that specifies a three-dimensional shape in the color space, the three-dimensional shape having a boundary including the boundary points.

Figure 9A:
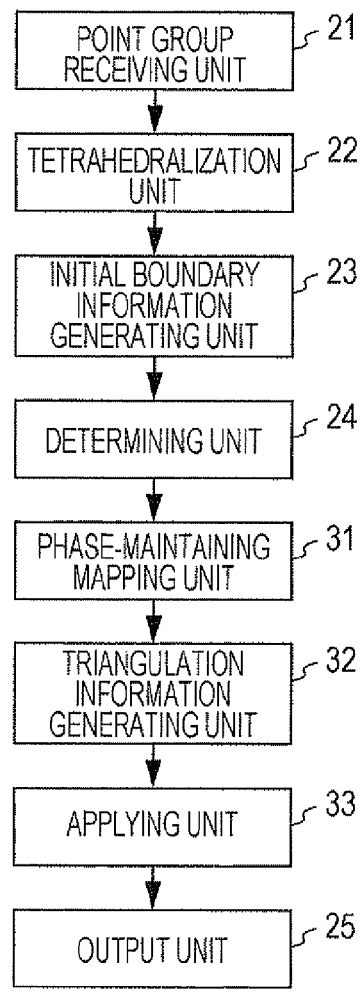
FIG. 9A is a block diagram illustrating another example functional configuration of the color gamut boundary information generating device according to the exemplary embodiment.
Figure 9B:
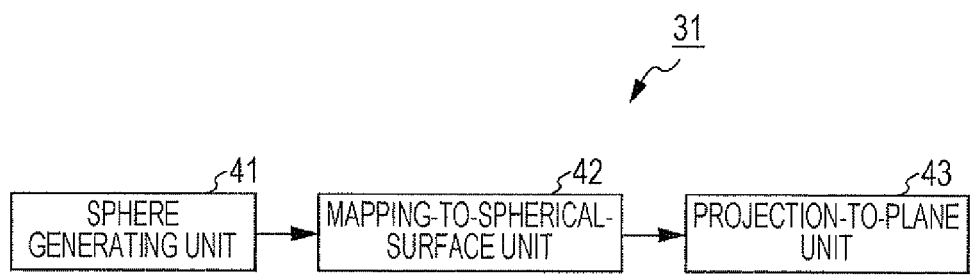
FIG. 9B is a block diagram illustrating an example functional configuration of a phase-maintaining mapping unit in the color gamut boundary information generating device according to the exemplary embodiment.

The controller 11 of the color gamut boundary information generating device 1 that performs this process functionally includes, as illustrated in FIG. 9A, the point group receiving unit 21, the tetrahedralization unit 22, the initial boundary information generating unit 23, the determining unit 24, a phase-maintaining mapping unit 31, a triangulation information generating unit 32, an applying unit 33, and the output unit 25. Also, according to an example of the exemplary embodiment, the phase-maintaining mapping unit 31 includes a sphere generating unit 41, a mapping-to-spherical-surface unit 42, and a projection-to-plane unit 43, as illustrated in FIG. 9B. Note that the parts same as those illustrated in FIG. 2 are denoted by the same reference numerals, and the corresponding description is omitted.

The phase-maintaining mapping unit 31 extracts, from the boundary information output from the determining unit 24, the coordinate information of individual vertexes included in the triangular faces specifies by the information included in the boundary information. The coordinate information is information about plural boundary points in a device independent target color space, such as an L*a*b color space.

The phase-maintaining mapping unit 31 projects the boundary points onto a virtual plane P that is generated in the target color space while maintaining the phases of the boundary points. In the configuration illustrated in FIG. 9, the sphere generating unit 41 of the phase-maintaining mapping unit 31 generates a virtual sphere S in the target color space. The center (normal coordinates) of the virtual sphere S is positioned on an inner side of a virtual face where the boundary points exist. In one example, the coordinates of the center may be the average of the coordinates of N boundary points in total. That is, when the coordinates of each boundary point are expressed by (xi, yi, zi), in which i=1, 2, . . . , and N, the coordinates of the center may be defined as (Σxi/N, Σyi/N, Σzi/N). In another example, the center of the virtual sphere S may be regarded as the center of a definition region of the target color space (in the case of L*a*b*, L*=50.0, a*=0.0, and b*=0.0). The radius of the virtual sphere S is not specified, and may be a value predetermined for each color space. For example, in the case of L*a*b*, the radius r may be 0.5.

Figures 10A, 10B:
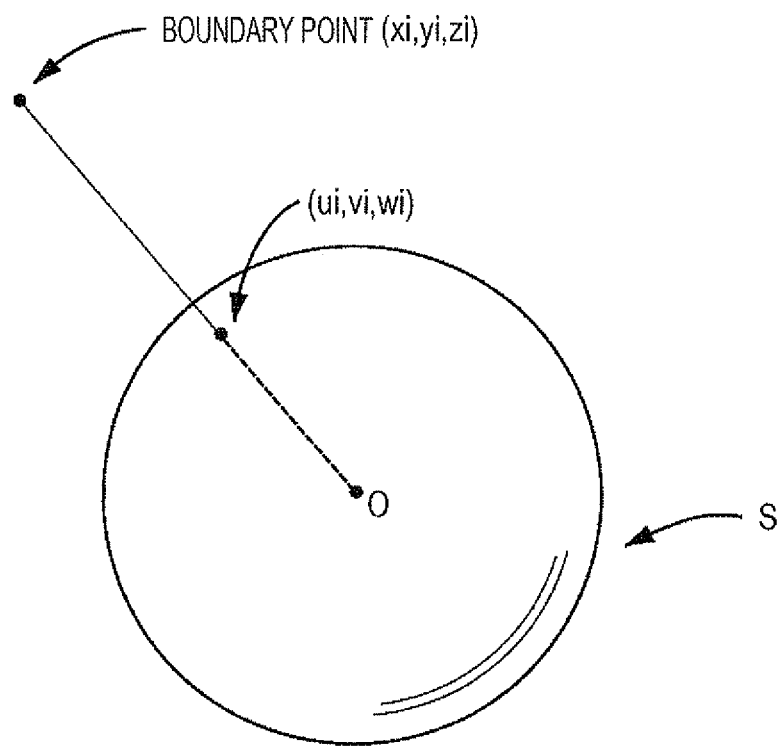
FIGS. 10A and 10B are explanatory diagrams illustrating an example of phase-maintaining mapping performed in the color gamut boundary information generating device according to the exemplary embodiment.

The mapping-to-spherical-surface unit 42 maps input boundary points (xi, yi, zi), in which i=1, 2, . . . , and N, onto the surface of the virtual sphere S. The mapping is performed while maintaining the phases of the boundary points so that the adjacency relationship among the boundary points is not changed (so that the nearest boundary point to a certain boundary point before mapping remains the nearest boundary point after mapping). Specifically, the mapping-to-spherical-surface unit 42 obtains the coordinates (ui, vi, wi) of the intersection of the surface of the virtual sphere S and a line segment that connects the center O (normal coordinates) of the virtual sphere S and a boundary point to be mapped, or the intersection of the surface of the virtual sphere S and a line extended from the line segment, and regards the coordinates of the intersection as the position to which the boundary point is to be mapped (FIG. 10A). The mapping-to-spherical-surface unit 42 stores, in the memory 12, pieces of identification information (represented by numbers i) for identifying original boundary points, the coordinates of the corresponding boundary points (xi, yi, zi), and the corresponding coordinates after mapping (ui, vi, wi) in association with one another (FIG. 10B).

The projection-to-plane unit 43 further maps each point (ui, vi, wi) on the surface of the sphere S obtained through the mapping of boundary points performed by the mapping-to-spherical-surface unit 42 onto the two-dimensional plane P. The mapping is performed while maintaining the phases of the points. In this case, stereographic projection illustrated in FIG. 11A may be used. In the stereographic projection, the plane P onto which a point is to be mapped is in contact with the virtual sphere S, a line segment that connects the contact point of the virtual sphere S and the plane P and the center of the virtual sphere S is extended, and the intersection of the extended line segment and the surface of the sphere S opposite to the plane P is regarded as the pole.

Figures 11A, 11B:
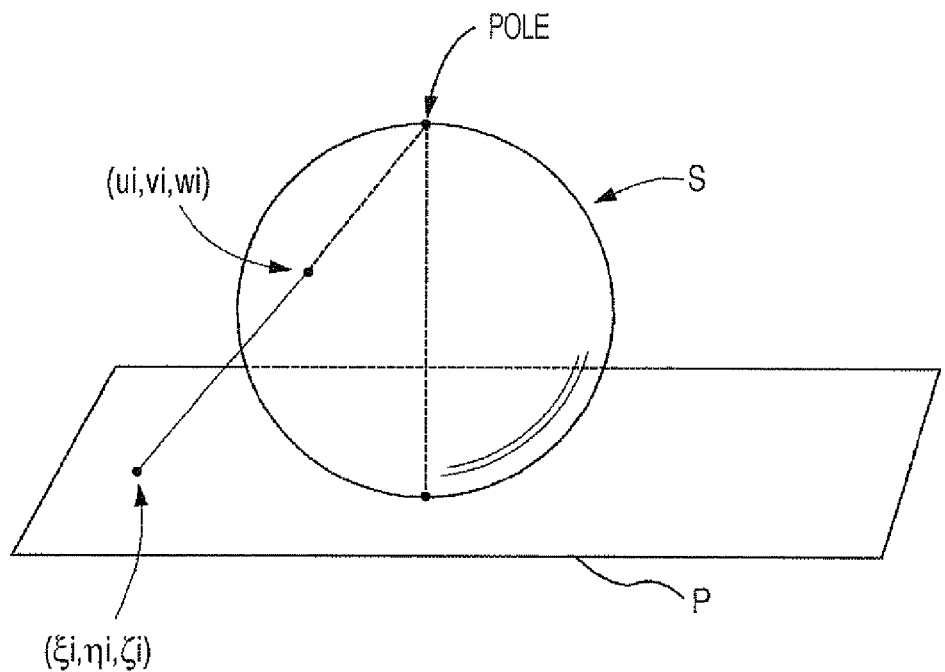
FIGS. 11A and 11B are explanatory diagrams illustrating another example of phase-maintaining mapping performed in the color gamut boundary information generating device according to the exemplary embodiment.

The projection-to-plane unit 43 extends individual line segments that connect the pole and the individual points (ui, vi, wi) on the sphere S obtained through the mapping of boundary points performed by the mapping-to-spherical-surface unit 42, and regards the individual intersections (ξi, ηi, ζi) of the extended line segments and the plane P as the coordinates to which the points are to be mapped. Then, the projection-to-plane unit 43 replaces the coordinates after mapping onto the sphere S (ui, vi, wi) with the corresponding coordinates after mapping onto the plane P (ξi, ηi, ζi) in the table in which the coordinates of the original boundary points (xi, yi, zi) are associated with the coordinates after mapping onto the sphere S (ui, vi, wi) (FIG. 11B). Accordingly, a table that stores the coordinates of the original boundary points (xi, yi, zi) and the coordinates after mapping onto the plane P (ξi, ηi, ζi) in association with each other is obtained. In this way, the phase-maintaining mapping unit 31 projects extracted boundary points onto the virtual plane P that is generated in the target color space, while maintaining the phases of the boundary points.

The triangulation information generating unit 32 executes a triangulation process by using the individual points (ξi, ηi, ζi) in the plane P obtained through the mapping performed by the phase-maintaining mapping unit 31 as vertexes. The process that is widely known as Delaunay triangulation may be applied to the triangulation, and thus the detailed description thereof is omitted here. With the execution of a Delaunay triangulation process, plural pairs of points in the plane P that are to be connected by edges in the triangulation are found. Specifically, the triangulation information generating unit 32 generates, as triangulation information, pairs of pieces of identification information for identifying vertexes that are to be connected by edges in the Delaunay triangulation.

For example, the foregoing triangulation information includes pieces of identification information of individual points that are associated with pieces of identification information of other points adjacent to the points (a list of pieces of identification information of connecting by side).

The applying unit 33 refers to the triangulation information generated by the triangulation information generating unit 32, and executes the following process on the individual extracted boundary points i=1, 2, . . . , and N in the target color space. Specifically, the applying unit 33 reads the identification information of a point associated with identification information i, and connects the boundary point specified by the identification information associated with the read identification information with the boundary point specified by the identification information i by an edge, thereby generating a virtual face divided into triangles in the target color space.

This face represents (at least part of) the boundary of a reproducible color range of an output-target device in the target color space. When this face is closed, the three-dimensional shape in the target color space defined by the face represents the reproducible color range of the output-target device. The applying unit 33 outputs, as color gamut boundary information, information that specifies the three-dimensional shape obtained thereby. The information is not specified as long as it represents the three-dimensional shape in the target color space generated by the applying unit 33. For example, the color gamut boundary information may include coordinate information of boundary points and triangulation information.

The phase-maintaining mapping unit 31 is not limited to that described above. For example, the mapping-to-spherical-surface unit 42 may use the following expressions in order to map input boundary points (xi, yi, zi), in which i=1, 2, ..., and N, onto the surface of the virtual sphere S while maintaining the phases of the boundary points.

That is, in the case of an L*a*b* color space, for example, the following expression is used.

$$C = \sqrt{a^{*2} + b^{*2}} \quad (2)$$

A rotational body of a quadric curve expressed by $$L^* = \alpha \cdot C^{*2} + L_0^* \quad (3)$$

in an L*C* plane (note that L*0 is the value of an L* component of the center coordinates of a virtual sphere) is used to obtain $\alpha = \alpha i$ (i=1, 2, ..., and N) for the individual boundary points i=1, 2, ..., and N to be mapped when the boundary points exist on the rotational body.

Then, in a plane Q including the center (normal coordinates) of the virtual sphere S and a boundary point i, the intersection of the virtual sphere S and a quadric curve obtained by cutting the rotational body of the quadric curve expressed by the following expression is obtained.

$$L^* = \alpha_i \cdot C^{*2} + L_0^* \quad (4)$$

Figure 12:
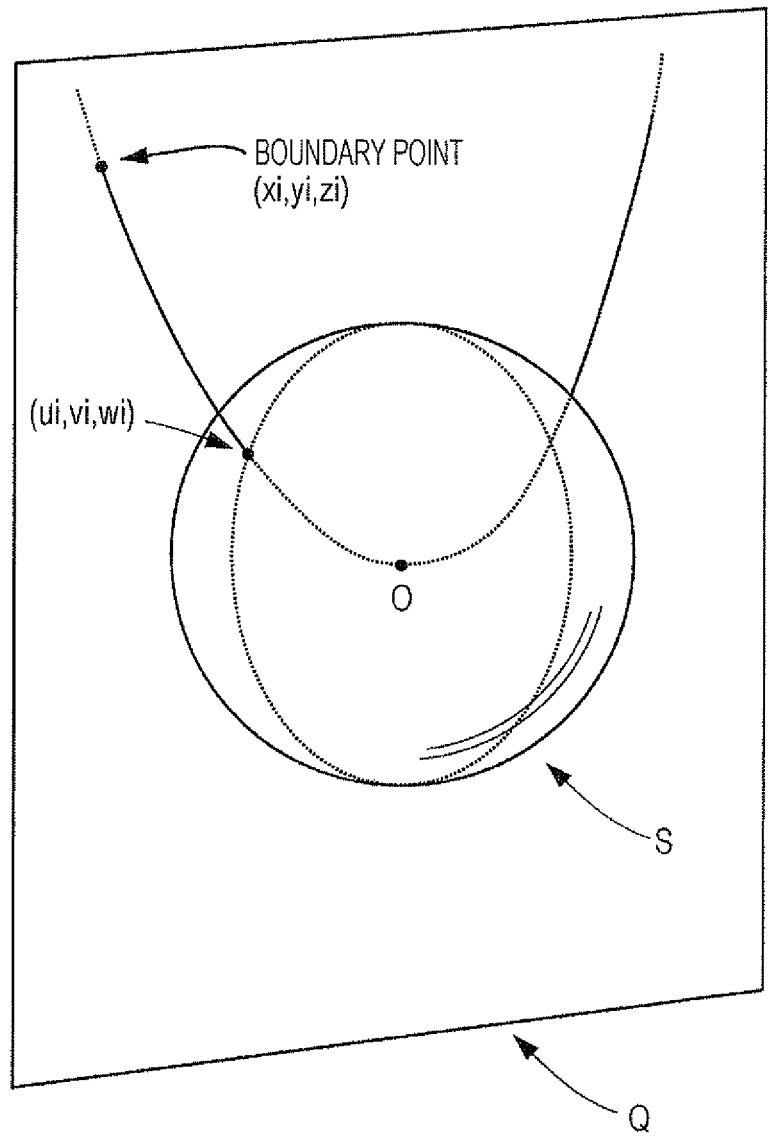
FIG. 12 is an explanatory diagram illustrating still another example of phase-maintaining mapping performed in the color gamut boundary information generating device according to the exemplary embodiment.

At this time, two intersections are obtained. Among the two intersections, the intersection nearer to the boundary point i is selected, the coordinates thereof (ui, vi, wi) are obtained, and the coordinates are regarded as the position to which the boundary point is to be mapped (FIG. 12).

Then, the mapping-to-spherical-surface unit 42 stores, in the memory 12, the identification information (here, the number i) for identifying the original boundary point, the coordinates of the corresponding boundary point (xi, yi, zi), and the corresponding coordinates after mapping (ui, vi, wi) in association with one another. As in this example, each boundary point may be connected to the center of the sphere by a curve expressed by a nonlinear function (quadric is used here, but another function may be used), and the intersection of the curve and the virtual sphere S may be used as the position to which the boundary point is mapped. In this case, the radius of the virtual sphere S is set to a sufficiently large value so that the interval between the points after mapping is not less than machine epsilon.

Figure 13:
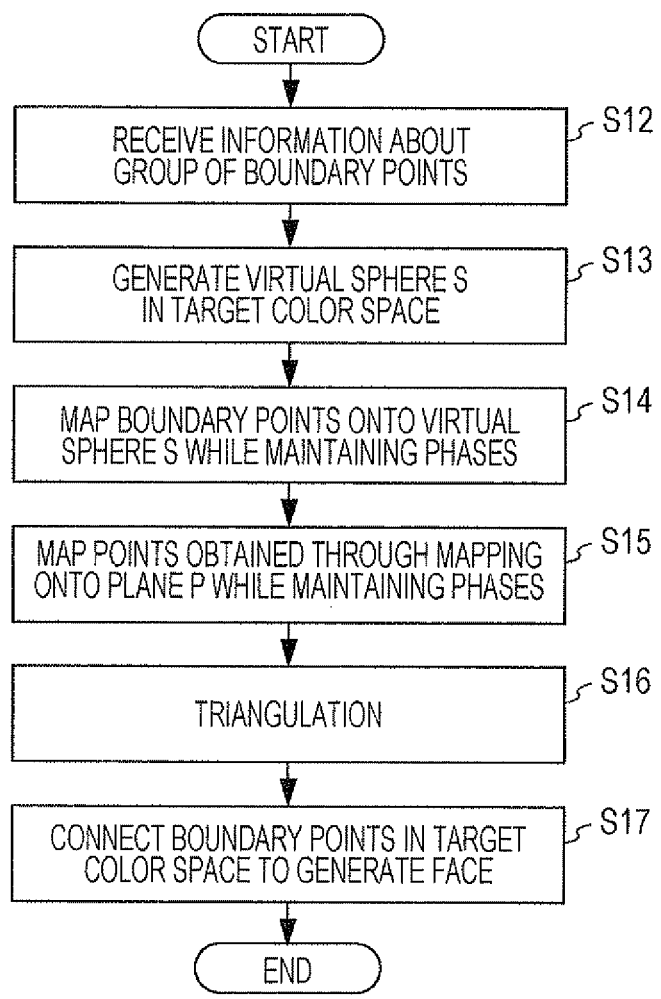
FIG. 13 is a flowchart illustrating an example process performed by the color gamut boundary information generating device according to the exemplary embodiment.

Next, an example operation of the color gamut boundary information generating device 1 according to the exemplary embodiment will be described with reference to FIG. 13. In the following example, mapping onto a virtual spherical surface is performed. The color gamut boundary information generating device 1 receives the boundary information output in step S11 in FIG. 8 (step S12), and generates a virtual sphere S in the target color space (step S13). Then, the color gamut boundary information generating device 1 maps the input boundary points (xi, yi, zi), in which i=1, 2, ..., and N, onto the surface of the virtual sphere S while maintaining the phases of the boundary points, that is, by using mapping of performing sequential deformation (step S14). The color gamut boundary information generating device 1 stores pieces of identification information (here, numbers i) for identifying the boundary points, the coordinates of the corresponding boundary points (xi, yi, zi), and the corresponding coordinates after mapping (ui, vi, wi) in association with one another.

Subsequently, the color gamut boundary information generating device 1 further maps the individual points (ui, vi, wi) on the surface of the virtual sphere S obtained through the mapping of the boundary points onto a virtual plane P in the target color space (step S15). This mapping operation is also performed while maintaining the phases of the boundary points, that is, by using mapping of performing sequential deformation. The color gamut boundary information generating device 1 replaces the coordinates after mapping onto the sphere S (ui, yi, wi) with the corresponding coordinates after mapping onto the plane P ($\xi i$, $\eta i$, $\zeta i$) in the table in which the coordinates of the original boundary points (xi, yi, zi) are associated with the coordinates after mapping onto the sphere S (ui, vi, wi). Accordingly, a table in which the identification information of the original boundary points and the coordinates thereof (xi, yi, zi) are associated with the coordinates after mapping onto the plane P ($\xi i$, $\eta i$, $\zeta i$) is obtained.

The color gamut boundary information generating device 1 executes a triangulation process by regarding the individual points ($\xi i$, $\eta i$, $\zeta i$) in the plane P as vertexes (step S16). The process that is widely known as Delaunay triangulation may be applied to the triangulation. With the execution of a Delaunay triangulation process, plural pairs of points in the plane P that are to be connected to each other by edges in the triangulation are found.

Furthermore, the color gamut boundary information generating device 1 refers to the triangulation information in order to obtain information about boundary points that are to be connected to the individual boundary points i=1, 2, ..., and N in the target color space by edges, and connects the points by edges (step S17). Accordingly, the color gamut boundary information generating device 1 generates a virtual face divided into triangles in the target color space.

As described above, according to the color gamut boundary information generating device 1 of the exemplary embodiment, information that specifies a color gamut boundary may be generated from plural points on the color gamut boundary randomly distributed in a device independent color space.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color gamut boundary information generating device comprising:
a processor configured to act as:
a receiving unit that receives a plurality of pieces of coordinate information indicating a plurality of points in a color space that is independent of an output device, respectively;
a tetrahedralizing unit that performs a tetrahedralization process, with the plurality of points in the color space specified by the plurality of pieces of coordinate information received by the receiving unit serving as vertexes;
a first generating unit that generates boundary information, which is a set of outermost triangular faces forming a convex hull among triangular faces obtained through the tetrahedralization process; and
a correcting unit that selects one of the triangular faces included in the boundary information generated by the first generating unit, the selected triangular face serving as a target face, regards a tetrahedron including the target face as a target tetrahedron, determines whether or not the target tetrahedron satisfies a predetermined condition, and, if the target tetrahedron does not satisfy the predetermined condition, selects the triangular faces included in the target tetrahedron except the target face, eliminates the target face from the boundary information, and adds the selected triangular faces to the boundary information, thereby correcting the boundary information;
wherein the predetermined condition used for determination includes at least one of the following conditions:
(i) in the triangular faces included in the target tetrahedron, except the target face, angles defining a vertex that is not included in the target face among the vertexes of the target tetrahedron satisfy a predetermined angle condition,
(ii) area ratios of the triangular faces included in the target tetrahedron satisfy a predetermined area ratio condition, and
(iii) signs of inner products of normal vectors of the triangular faces included in the target tetrahedron satisfy a predetermined sign condition.

2. The color gamut boundary information generating device according to claim 1,
wherein the predetermined condition used for determination further includes:
(iv) among vertexes of the target tetrahedron including the target face, the vertex that is the nearest to the center of gravity of the target tetrahedron is included in the target face.

3. The color gamut boundary information generating device according to claim 2,
wherein the predetermined angle condition is that, in the triangular faces included in the target tetrahedron, except the target face, a cosine value of an angle defining a vertex not included in the target face among the vertexes of the target tetrahedron is within a predetermined range.

4. The color gamut boundary information generating device according to claim 3, further comprising:
a mapping unit that maps boundary points in the color space that is independent of an output device to corresponding points in a two-dimensional region while maintaining respective phases of the boundary points, the boundary points being vertexes included in the triangular faces included in the boundary information corrected by the correcting unit;
a triangulating unit that performs triangulation on the inside of a convex hull including a plurality of points in the two-dimensional region obtained by the mapping unit, thereby generating triangulation information, which is a result of the triangulation; and
a second generating unit that generates color gamut boundary information on the basis of the triangulation information generated by the triangulating unit, the color gamut boundary information being information that specifies a three-dimensional shape in the color space, the three-dimensional shape having a boundary including the boundary points.

5. The color gamut boundary information generating device according to claim 2, further comprising:
a mapping unit that maps boundary points in the color space that is independent of an output device to corresponding points in a two-dimensional region while maintaining respective phases of the boundary points, the boundary points being vertexes included in the triangular faces included in the boundary information corrected by the correcting unit;
a triangulating unit that performs triangulation on the inside of a convex hull including a plurality of points in the two-dimensional region obtained by the mapping unit, thereby generating triangulation information, which is a result of the triangulation; and
a second generating unit that generates color gamut boundary information on the basis of the triangulation information generated by the triangulating unit, the color gamut boundary information being information that specifies a three-dimensional shape in the color space, the three-dimensional shape having a boundary including the boundary points.

6. The color gamut boundary information generating device according to claim 1, further comprising:
a mapping unit that maps boundary points in the color space that is independent of an output device to corresponding points in a two-dimensional region while maintaining respective phases of the boundary points, the boundary points being vertexes included in the triangular faces included in the boundary information corrected by the correcting unit;
a triangulating unit that performs triangulation on the inside of a convex hull including a plurality of points in the two-dimensional region obtained by the mapping unit, thereby generating triangulation information, which is a result of the triangulation; and
a second generating unit that generates color gamut boundary information on the basis of the triangulation information generated by the triangulating unit, the color gamut boundary information being information that specifies a three-dimensional shape in the color space, the three-dimensional shape having a boundary including the boundary points.

7. A color gamut boundary information generating method comprising:
a processor configured to perforin the steps of:
receiving a plurality of pieces of coordinate information indicating a plurality of points in a color space that is independent of an output device, respectively;
performing a tetrahedralization process, with the plurality of points in the color space specified by the received plurality of pieces of coordinate information serving as vertexes;

generating boundary information, which is a set of outermost triangular faces forming a convex hull among triangular faces obtained through the tetrahedralization process; and selecting one of the triangular faces included in the generated boundary information, the selected triangular face serving as a target face, regarding a tetrahedron including the target face as a target tetrahedron, determining whether or not the target tetrahedron satisfies a predetermined condition, and, if the target tetrahedron does not satisfy the predetermined condition, selecting the triangular faces included in the target tetrahedron except the target face, eliminating the target face from the boundary information, and adding the selected triangular faces to the boundary information, thereby correcting the boundary information;

wherein the predetermined condition used for determination includes at least one of the following conditions:

(i) in the triangular faces included in the target tetrahedron, except the target face, angles defining a vertex that is not included in the target face among the vertexes of the target tetrahedron satisfy a predetermined angle condition, (ii) area ratios of the triangular faces included in the target tetrahedron satisfy a predetermined area ratio condition, and (iii) signs of inner products of normal vectors of the triangular faces included in the target tetrahedron satisfy a predetermined sign condition.

8. The color gamut boundary information generating method according to claim 7, wherein the predetermined condition used for determination further includes:

(iv) among vertexes of the target tetrahedron including the target face, the vertex that is the nearest to the center of gravity of the target tetrahedron is included in the target face.

9. The color gamut boundary information generating method according to claim 8, wherein the predetermined angle condition is that, in the triangular faces included in the target tetrahedron, except the target face, a cosine value of an angle defining a vertex not included in the target face among the vertexes of the target tetrahedron is within a predetermined range.

10. The color gamut boundary information generating method according to claim 9, further comprising:

mapping boundary points in the color space that is independent of an output device to corresponding points in a two-dimensional region while maintaining respective phases of the boundary points, the boundary points being vertexes included in the triangular faces included in the corrected boundary information;

performing triangulation on the inside of a convex hull including a plurality of points in the two-dimensional region obtained through the mapping, thereby generating triangulation information, which is a result of the triangulation; and generating color gamut boundary information on the basis of the triangulation information generated through the triangulation, the color gamut boundary information being information that specifies a three-dimensional shape in the color space, the three-dimensional shape having a boundary including the boundary points.

11. The color gamut boundary information generating method according to claim 8, further comprising:

mapping boundary points in the color space that is independent of an output device to corresponding points in a two-dimensional region while maintaining respective phases of the boundary points, the boundary points being vertexes included in the triangular faces included in the corrected boundary information;

performing triangulation on the inside of a convex hull including a plurality of points in the two-dimensional region obtained through the mapping, thereby generating triangulation information, which is a result of the triangulation; and generating color gamut boundary information on the basis of the triangulation information generated through the triangulation, the color gamut boundary information being information that specifies a three-dimensional shape in the color space, the three-dimensional shape having a boundary including the boundary points.

12. The color gamut boundary information generating method according to claim 7, further comprising:

mapping boundary points in the color space that is independent of an output device to corresponding points in a two-dimensional region while maintaining respective phases of the boundary points, the boundary points being vertexes included in the triangular faces included in the corrected boundary information;

performing triangulation on the inside of a convex hull including a plurality of points in the two-dimensional region obtained through the mapping, thereby generating triangulation information, which is a result of the triangulation; and generating color gamut boundary information on the basis of the triangulation information generated through the triangulation, the color gamut boundary information being information that specifies a three-dimensional shape in the color space, the three-dimensional shape having a boundary including the boundary points.

13. A non-transitory computer readable medium storing a program causing a computer to execute a process, the process comprising:

receiving a plurality of pieces of coordinate information indicating a plurality of points in a color space that is independent of an output device, respectively;

performing a tetrahedralization process, with the plurality of points in the color space specified by the received plurality of pieces of coordinate information serving as vertexes;

generating boundary information, which is a set of outermost triangular faces forming a convex hull among triangular faces obtained through the tetrahedralization process; and selecting one of the triangular faces included in the generated boundary information, the selected triangular face serving as a target face, regarding a tetrahedron including the target face as a target tetrahedron, determining whether or not the target tetrahedron satisfies a predetermined condition, and, if the target tetrahedron does not satisfy the predetermined condition, selecting the triangular faces included in the target tetrahedron except the target face, eliminating the target face from the boundary information, and adding the selected triangular faces to the boundary information, thereby correcting the boundary information;

wherein the predetermined condition used for determination includes at least one of the following conditions:

(i) in the triangular faces included in the target tetrahedron, except the target face, angles defining a vertex that is not included in the target face among the vertexes of the target tetrahedron satisfy a predetermined angle condition, (ii) area ratios of the triangular faces included in the target tetrahedron satisfy a predetermined area ratio condition, and (iii) signs of inner products of normal vectors of the triangular faces included in the target tetrahedron satisfy a predetermined sign condition.

14. The computer readable medium according to claim 13, wherein the predetermined condition used for determination further includes:

(iv) among vertexes of the target tetrahedron including the target face, the vertex that is the nearest to the center of gravity of the target tetrahedron is included in the target face.

* * * * *